United States Patent [19]
Duchscher

[11] 3,738,048
[45] June 12, 1973

[54] BAIT AND HOOK HOLDER
[76] Inventor: James L. Duchscher, 1916 7th Street N.W., Minot, N. Dak. 58701
[22] Filed: May 4, 1971
[21] Appl. No.: 140,111

[52] U.S. Cl. .................................. 43/44.2, 43/44.8
[51] Int. Cl. ............................................. A01k 83/06
[58] Field of Search ............... 43/44.2, 44.8, 44.83, 43/44.86

[56] References Cited
UNITED STATES PATENTS

| | | | |
|---|---|---|---|
| 3,293,790 | 12/1966 | Konomos | 43/44.2 |
| 2,900,754 | 8/1959 | Orlik | 43/44.2 |
| 2,241,152 | 5/1941 | Moats | 43/44.2 |
| 2,622,363 | 12/1952 | Bodwell | 43/44.2 |
| 2,871,611 | 2/1959 | Shepard, Jr. | 43/44.2 |

FOREIGN PATENTS OR APPLICATIONS

| | | | |
|---|---|---|---|
| 611,651 | 1/1961 | Canada | 43/44.83 |

Primary Examiner—Robert Peshock
Assistant Examiner—James H. Czerwonky
Attorney—Clarence A. O'Brien and Harvey B. Jacobson

[57] ABSTRACT

An angler's line attached fishing device characterized by a U-shaped bait and hook holder. One leg of the holder has a line attaching eye. The other leg constitutes, in part, a bait impaling shank. The shank has a free pointed end adapted to pierce the bait lengthwise and in such a manner that it can be impaled, positioned and retained on the shank. The pointed end fits into the bore of a detachable sleeve at one end thereof. A projecting, other end portion of the sleeve provides a socket for the shank of a conventional fishhook. Latches on the sleeve position and retain the sleeve on the shank and hold the shank portion of the attachable and detachable fishhook. Prongs are also provided to assist in holding the bait, a smelt, on the shank and sleeve.

5 Claims, 5 Drawing Figures

PATENTED JUN 12 1973  3,738,048
Fig. 1 Fig. 2 Fig. 3
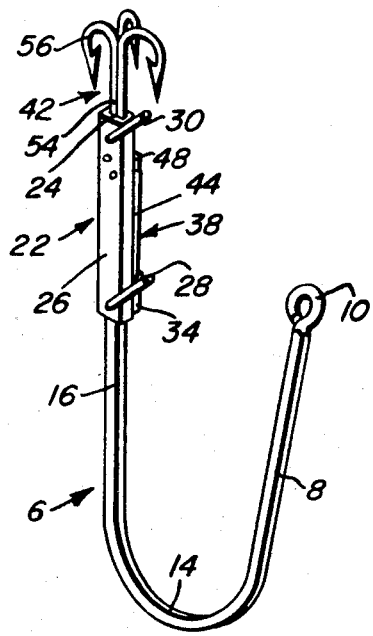
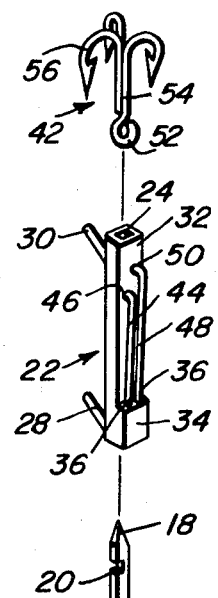
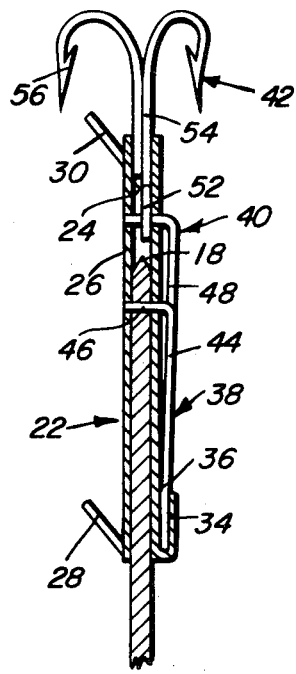
Fig. 4 Fig. 5
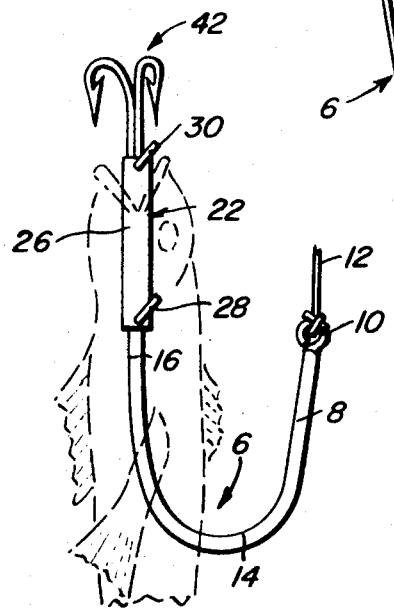
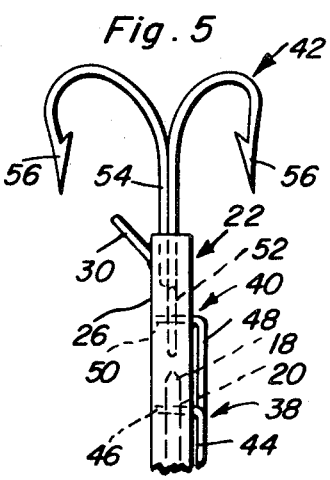
James L. Duchscher
BY *Clarence A. O'Brien*
and *Harvey B. Jacobson*
Attorneys

BAIT AND HOOK HOLDER

The present invention relates to line attached fishing devices and pertains, more particularly, to a device which is characterized by an improved line attached holder wherein a shank portion of the holder serves to accommodate the attachable and detachable fishhook and the means by way of which the hook is mounted on the shank.

The idea of detachably latching and impaling a minnow or bait on a fishhook is shown to be old in a U.S. Pat. to C. K. Woodring, No. 2,087,369. The use of a yoke for attachment to a line and having hook means on one of the legs of the yoke is shown in Nelson B. Place, U.S. Pat. No. 2,719,380. The idea of separable and connectible impaling means for a minnow or live bait is shown in S. T. Bonner, U.S. Pat. No. 1,152,698.

The foregoing patents are, broadly stated, indicative of the general state of the art to which the present invention relates and can be referred to for informative and background purposes.

Briefly, the improved bait and hook holder herein disclosed is characterized by a rigid substantially U-shaped yoke which constitutes a holder. One leg of the yoke terminates in any eye to which the fishing line is attached. The other leg constitutes a shank, is non-circular in cross section and has a pointed leading or free end and a keeper notch adjacent the free end. This notched pointed end serves to accommodate an attachable and detachable sleeve. The sleeve is provided on one side with outstanding prongs which facilitate positioning and retaining the bait, a smelt for example, on the shank. The opposite side of the sleeve is provided with selectively usable L-shaped latches which function to hold the sleeve on the shank and also the shank of the fishhook in its given ready-to-use position.

One improvement resides in providing a U-shaped or yoke-type holder which is of a heavy duty type and wherein the pointed shank has a keeper notch to accommodate a projectable and retractable detent on a resilient latch.

A further feature has to do with the use of a multipurpose sleeve, that is a sleeve which is provided on one side with outstanding bait positioning and retaining prongs and provided on an opposite side with L-shaped resilient latches one of which serves to hold the sleeve on the shank and the other one the shank of the hook in a given position in a socket portion of the sleeve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a line attached fishing device constructed in accordance with the invention, the line being omitted, the sleeve being in place and holding the fishhook in its ready-to-serve position.

FIG. 2 is an exploded perspective view showing the principal component parts of the over-all fishing device.

FIG. 3 is an enlarged view partly in section and elevation and which shows the prongs and latches and particularly the manner in which the latches serve to assemble the sleeve and fishhook.

FIG. 4 is a view on a smaller scale showing how the smelt or other live bait is impaled and readied for use on the device.

And FIG. 5 is a view similar to FIG. 3 but with the parts in elevation and with portions appearing in phantom lines to bring out the construction and arrangement of the coacting component parts.

Referring first to the aforementioned part which constitutes the bait and hook holder, this part is substantially U-shaped and may also be described as a yoke and is denoted, generally designated, by the numeral 6. It is perhaps best shown in FIG. 2 wherein it will be observed that it comprises a rigid non-circular leg or limb 8 at the left the free end of which is provided with an eye 10 for the attachment of an end portion of a fishing line 12 thereto (see FIG. 4). This leg or limb is joined by a curvate bight portion 14 to a slightly longer leg 16 which is here differentiated as a shank. The leading or forward end portion of this shank is suitably pointed as at 18 and is provided adjacent but inwardly of the point with a side opening keeper notch 20.

This holder or yoke serves to accommodate the attachable and detachable coupling sleeve which is denoted at 22 and is of requisite length and has an open-ended non-circular bore 24 to accommodate the non-circular notched shank 16, that is the portions 18 and 20 thereof in particular. The sleeve is provided on one flat side 26 with diagonal longitudinally spaced outstanding penetrating and positioning prongs 28 and 30 which serve in the manner shown in FIG. 4. The opposite flat side 32 (FIG. 2) of this sleeve is provided at one end with a reinforced boss 34 in which end portions 36 of L-shaped resilient latches are anchored. One latch is slightly shorter than the other and is denoted by the numeral 38 (FIG. 3). This latch serves to mount and retain the sleeve on the shank. The other latch is denoted by the numeral 40 and its function is to connect and retain the shank of the fishhook 42 to the sleeve. The long leg of the latch 38 is denoted at 44 and the short leg at 46 and is projectable through keeper openings provided therefor in walls of the sleeve and more particularly is projectable into the keeper notch 20 in a manner which is self-evident and which serves to hold the sleeve 22 in position on the pointed shank. The long leg 48 of the latch 40 has its short leg 50 projecting through keeper openings provided therefor in the projecting socket member of the sleeve. Both short legs serve as detents and the detent 50 serves to project itself through an eye 52 on the shank 54 of the fishhook 42. The barbed hooks are denoted at 56. In practice the shank 54 is fitted into the socket which is thus provided and is latched in position in the manner shown in FIGS. 3 and 5 in particular.

FIG. 2 shows the U-shaped yoke or yoke-type holder 6 and the component parts thereof. The sleeve 22 is shown and is so constructed and arranged that the pointed prong 18 can be slipped telescopingly into the bore of the sleeve and latched in place with the assistance of the short latch 38. Then the fishhook 42 can be fitted into the projecting socket portion of the sleeve after which it is latched in place through the aid of the leg or detent 50 on the latch 40. Both latches are on the same side 32 of the sleeve and the oblique prongs 28 and 30 are on the opposite side. It is obvious that when the sleeve has been removed the smelt or other bait can be fitted over the pointed prongs and thus impaled in place in the manner suggested in phantom lines in FIG.

4. After the bait is thus positioned the sleeve is located and latched in place and following that, the hook 42 is inserted and also latched in place. By having latch means for the fishhook it is obvious that fishhooks of different sizes can, in actual practice, be used ranging from small to large to medium (not shown).

The construction of the component parts is believed to be evident from the views construed singly and collectively. Also the manner of impaling and rigging the bait in place and applying the hook means is likewise thought to be evident. Accordingly, a more extended description is deemed to be unnecessary.

The foregoing is considered to be illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A line attached fishing device comprising, in combination, a rigid U-shaped yoke embodying a first leg terminating in an eye at one end and adapted for the attachment thereto of an end of a fishing line, a second leg slightly longer than the first leg and joined thereto by a curvate bight portion, said second leg being non-circular in cross section, constituting a shank, and having a forward end which is pointed and provided inwardly of the point with a keeper notch, an attachable and detachable sleeve having a non-circular bore for telescopic reception of the pointed shank, said sleeve being provided on one side with exterior resilient L-shaped latches, each latch comprising a long leg and a short leg and the short legs of the respective latches constituting detents, one detent being detachably connectible with said keeper notch to hold the sleeve in place on the shank, the sleeve having an end portion projecting beyond the pointed end of the shank and providing a socket, the wall portions of said sleeve adjacent said socket having openings each to accommodate the short leg of a cooperating detent, and a fishhook having a shank with an eye fitting telescoping into the socket portion and held removably in place by the co-acting applicable and removable detent.

2. The line attached device defined in and according to claim 1 and wherein the latches are provided on one side of the sleeve and are accessibly arranged for selective actuation, an opposite side of said sleeve being provided with longitudinally spaced outstanding prongs, said prongs being adapted to assist in positioning and maintaining an artificial bait in place.

3. A line attached fishing device comprising, in combination, a rigid U-shaped yoke of a size to impale and retain a bait-sized smelt, said yoke embodying a first leg terminating in a fish line attaching eye; a second leg coplanar with and slightly longer than and joined to said first leg by a complemental bight portion, said second leg constituting a shank and having a forward end terminating in a bait penetrating point and provided inwardly of said point with a keeper notch for a detent; an attachable and detachable sleeve having a bore for insertable and removable reception of the pointed end of said shank, said sleeve being provided on one exterior side with at least one resilient L-shaped latch, said latch comprising a long leg having an end anchored on said sleeve and a complemental short leg having a free end constituting a detent, said detent being seatable in said keeper notch and detachably connectible with the sleeve in a manner to position and retain the sleeve in a usable place on the shank, said sleeve having an extending end portion projecting beyond the pointed end of the shank and providing a socket member for reception and retention of the shank of a readily attachable and detachable fishhook.

4. The line attached fishing device defined in and according to claim 3, and wherein opposed oriented wall portions of said socket member are provided with aligned and registering keeper openings for reception and retention of a coordinating detent, and a second resilient L-shaped latch structurally and functionally similar to said first-named L-shaped latch and also provided and mounted on said one side of said sleeve and likewise embodying a long leg having an end anchored on said sleeve and a companion short leg having a free end providing a detent for retention of a readily attachable and detachable fishhook, said last-named detent passing through and being normally lodged and retained in a given position in said registering keeper openings.

5. The line attached fishing device defined in and according to claim 4, and wherein both L-shaped latches are mounted on said one side in close spaced parallel relationship, vary in length, and are selectively actuatable, that side of the sleeve opposite said one side being provided with spaced longitudinally alined oblique angled outstanding bait positioning and retaining prongs.

* * * * *